United States Patent [19]

Pettus

[11] Patent Number: 5,086,808

[45] Date of Patent: Feb. 11, 1992

[54] BALANCED SLEEVE CONTROL CHOKE

[75] Inventor: Ronald G. Pettus, Houston, Tex.

[73] Assignee: Cooper Industries, Inc., Houston, Tex.

[21] Appl. No.: 625,303

[22] Filed: Dec. 7, 1990

[51] Int. Cl.$^5$ .................. F16K 47/14; F16K 39/02
[52] U.S. Cl. ...................... 137/625.3; 137/625.37; 251/282; 251/368
[58] Field of Search .................. 251/282, 368; 137/625.3, 625.37, 625.38

[56] References Cited

U.S. PATENT DOCUMENTS

| | | | |
|---|---|---|---|
| 3,298,389 | 1/1967 | Freeman | 251/282 X |
| 3,757,816 | 9/1973 | Price | 251/368 X |
| 4,103,702 | 8/1978 | Duthion et al. | 137/625.3 X |
| 4,240,609 | 12/1980 | Hahn et al. | 251/282 |
| 4,384,592 | 5/1983 | Ng | 137/625.3 X |
| 4,471,810 | 9/1984 | Muchow et al. | 137/625.37 |
| 4,569,370 | 2/1986 | Witt | 137/625.3 |
| 4,735,229 | 4/1988 | Lancaster | 251/122 |
| 4,971,099 | 11/1990 | Cyvas | 251/282 X |

Primary Examiner—John Rivell
Attorney, Agent, or Firm—Jackie L. Duke; Nelson A. Blish; Alan R. Thiele

[57] ABSTRACT

A balanced sleeve control choke includes a choke with inlet and outlet flow passages intersecting in a cylindrical flow chamber. A balanced external sleeve and cage trim configuration which vents downstream pressure to a balance chamber within the choke body includes an external sleeve with a wear sleeve of tungsten carbide shrink fitted therein is reciprocable within the flow chamber to control flow between the inlet and outlet flow passages. The external sleeve is closed at one end with a stem extending therefrom which is reciprocated by a handwheel operated travelling nut assembly. The external sleeve telescopes over a flow cage of composite construction secured within the flow chamber with a portion of the flow cage constructed of tungsten carbide with pressure balancing ports therethrough. The external sleeve has ports disposed within its wall which communicate downstream pressure to a balance chamber disposed thereabout. The flow cage has a seal neck extending from a closed upper end with a seal assembly disposed thereon which seals within the external sleeve and acts in conjunction with the balance chamber to eliminate any pressure forces on the travelling nut assembly.

16 Claims, 4 Drawing Sheets

BALANCED SLEEVE CONTROL CHOKE

BACKGROUND

This invention concerns a control choke with a balanced external sleeve and cage trim used in the production of oil and gas wells. Prior control chokes have a flow cage with pressure balancing ports therethrough disposed within a choke body for limiting the flow rate through the control choke. These flow cages typically have an external or internal sleeve reciprocable thereon for varying the number of pressure balancing ports exposed to the incoming flow stream. This arrangement allows throttling of the flow stream through the choke to obtain a desired flow rate.

As oil and gas production from higher pressure wells has developed, the need for control chokes to use in these applications has arisen. The prior control chokes described above have required larger and more expensive means for reciprocating the flow sleeves on the flow cage to throttle the flow of production fluid. The present invention provides a novel arrangement of flow sleeve and cage which eliminates pressure loading of the reciprocation means and thereby allows use of a smaller and less expensive reciprocation means.

U.S. Pat. No. 4,240,609 to G. L. Hahn et al. discloses a production choke with means for reciprocating the closure element which includes a hollow stem with a floating piston therein to substantially counterbalance the pressure forces on the stem.

U.S. Pat. No. 4,735,229 to Lancaster is an example of a control choke with a flow cage having an external sleeve disposed thereabouts which allows throttling of the flow stream through the choke. No means for counterbalancing the pressure loads on the stem are disclosed.

SUMMARY

The subject invention relates to a novel balanced sleeve control choke which uses a unique configuration for the flow cage and external sleeve which prevents pressure loads from reaching the stem of the actuation means. This configuration allows a smaller and less expensive positioning means for controlling the relative position of the flow cage and external sleeve and consequently the flow rate through the choke.

In its preferred embodiment, the present invention includes a choke body of conventional configuration with inlet and outlet flow passages intersecting in a central flow chamber. A flow cage is disposed in the flow chamber to control flow between the inlet and outlet flow passages. The flow cage has an extended neck with sealing means disposed thereon which seals within a recess in an external sleeve as it telescopes over the flow cage. The flow cage has a multiplicity of pressure balancing ports diposed circumferentially which are exposed to fluid flow by movement of the external sleeve to control the flow rate through the choke. A retainer sleeve is disposed about the external sleeve and retained by the flange of a bonnet assembly which is secured to the choke body. The retainer sleeve seals on a stem integrally formed on the external sleeve and in combination with sealing means on the external sleeve form a balance chamber. Porting means in the external sleeve communicates pressure in the flow chamber to the balance chamber to prevent pressure forces from being transmitted to the stem. A travelling nut assembly disposed in the bonnet assembly permits reciprocation of the stem.

An object of the present invention is to provide a novel control choke apparatus which allows the use of smaller and less expensive positioning means.

Another object of the present invention is to provide a control choke which provides a novel trim configuration which eliminates pressure forces acting on the stem and its associated actuation means.

BRIEF DESCRIPTION OF THE DRAWINGS

These and other objects and advantages of the present invention are set forth below and further made clear by reference to the drawings wherein.

DESCRIPTION OF THE PREFERRED EMBODIMENT

Figure 1A:
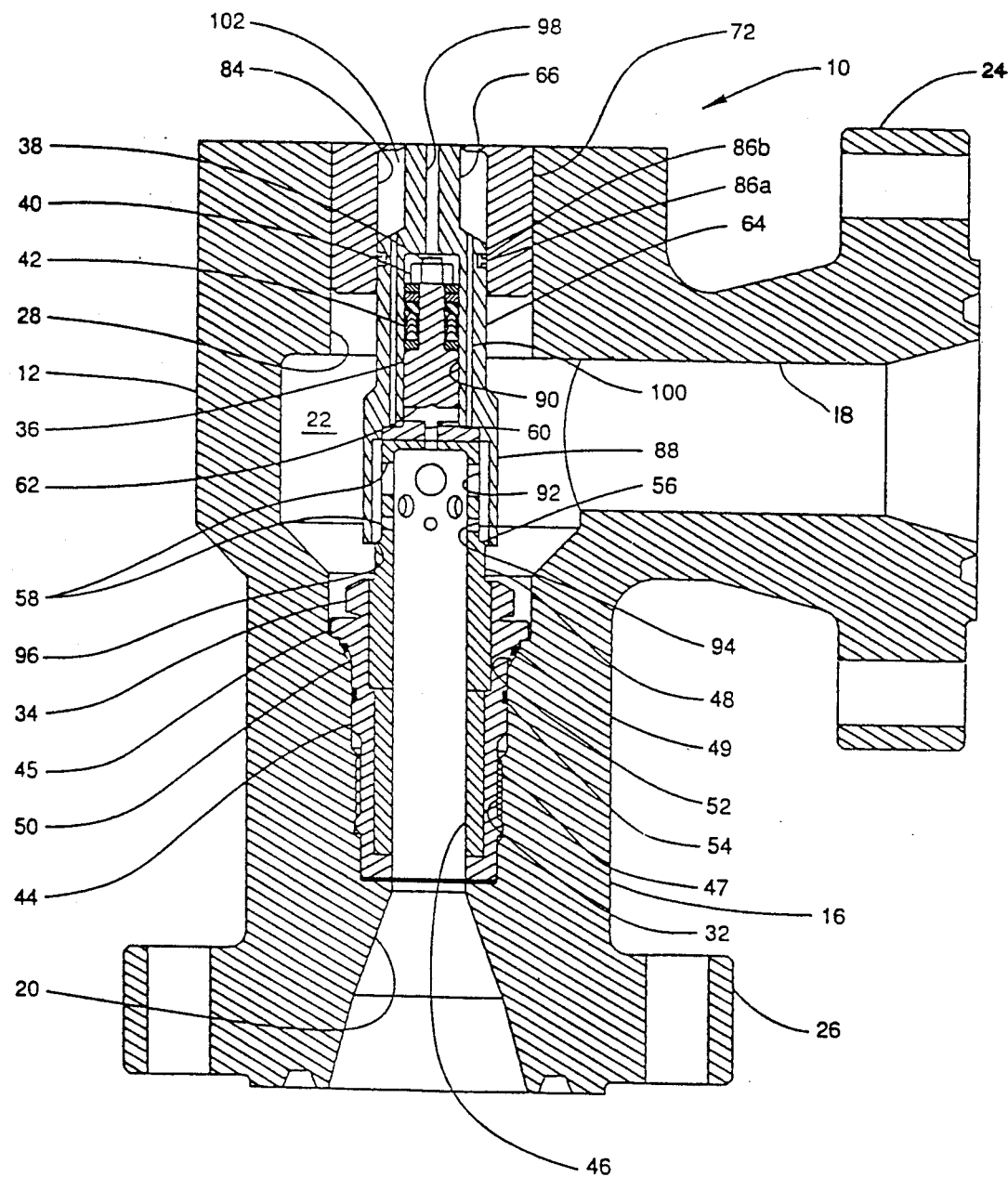
FIGS. 1A and 1B are elevational views, partly in section, of the balanced sleeve control choke in a closed position with FIG. 1A being the lower portion and FIG. 1B being the upper portion thereof.
Figure 1B:
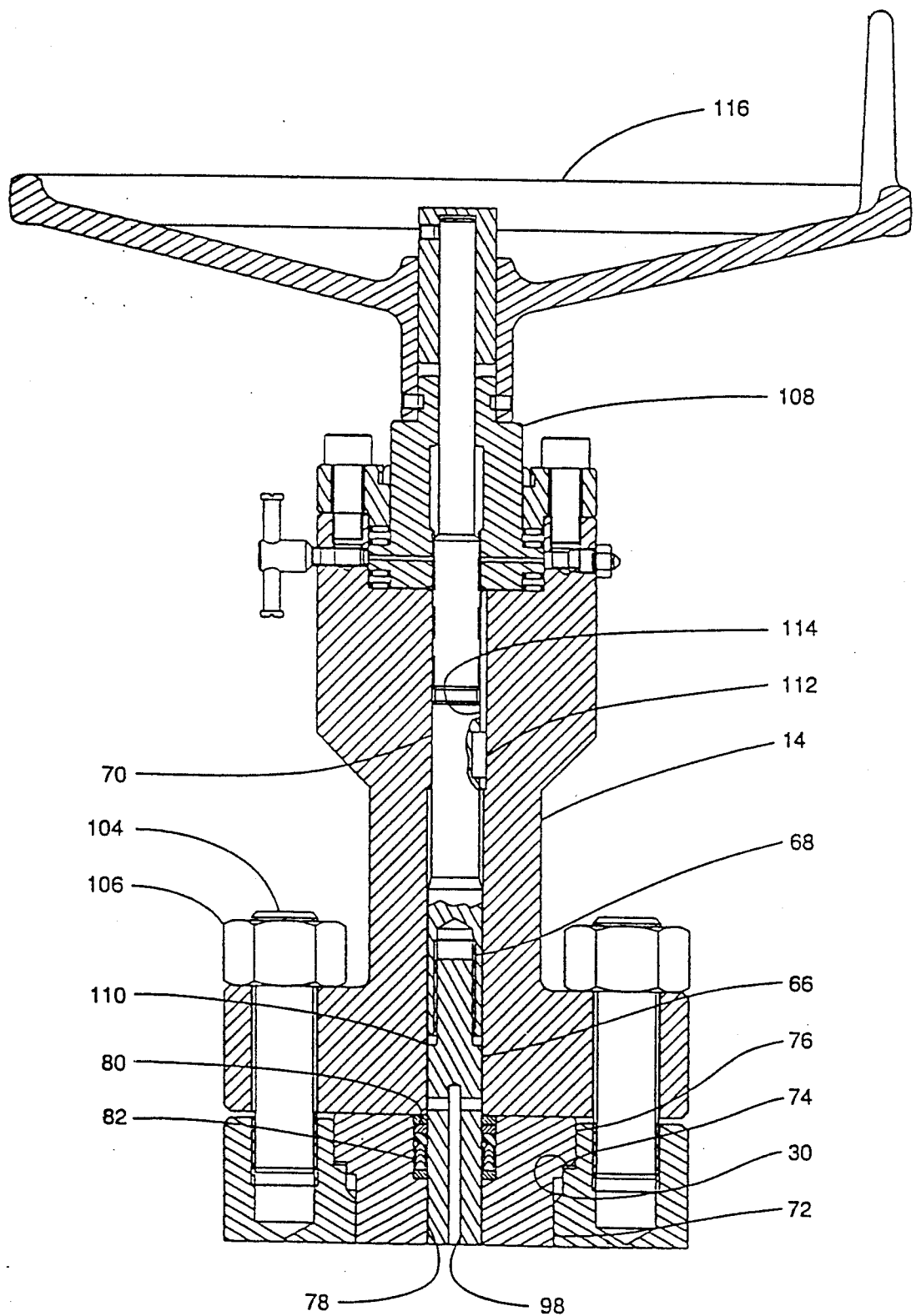

With reference to FIGS. 1A and 1B, the balanced sleeve control choke, denoted generally by numeral 10 is composed of choke assembly 12 and bonnet assembly 14. Choke assembly 12 is composed of choke body 16 with inlet flow passage 18 and outlet flow passage 20 intersecting therein to form flow chamber 22. Inlet flow passage 18 is provided with flanged connection 24 at its outer end for connection to a flowline, not shown. Similarly, outlet flow passage 20 has flanged connection 26 disposed at its outer end for connection to a flowline, not shown. Bonnet passage 28 intersects flow chamber 22 on the opposite side of choke body 16 from outlet flow passage 20 and is coaxial therewith. Bonnet passage 28 extends to the exterior of choke body 16 with seal shoulder 30 formed at the outer portion thereof. Internal thread 32 is formed in outlet flow passage 20 to secure flow cage 34 in a manner to be described hereinafter.

Flow cage 34 is a generally cylindrical member of composite construction closed on one end with reduced diameter seal neck 36 extending axially therefrom. Seal neck 36 has external thread 38 and nut 40 on the outer end thereof for securing seal assembly 42 thereon. The lower portion of flow cage 34 consists of a cage body 44, wear sleeve 46 and flow body 48. Wear sleeve 46 and flow body 48 are of a wear resistant material as tungsten carbide and shrink fitted with cage body 44. Flange 45 is located medially on cage body 44 with external thread 47 formed on the lower portion thereof. Annular metal seal ring 49 is disposed on the exterior seal surface 50 of cage body 44 and sealingly engages tapered seal surface 52 of outlet flow passage 20 when external threads 47 engage internal threads 32. Suitable secondary elastomeric sealing means as 0 ring 54 is disposed on cage body 44 between seal ring 49 and threads 47 and seals within outlet passage 20.

Flow body 48 has tapered face 56 disposed on its exterior with a plurality of radially directed flow apertures 58 of varying diameter disposed therein. Apertures 58 extend through the wall of flow body 48 and are arranged in pairs of the same diameter on opposite sides of flow body 48 in facing relationship. This arrangement of flow apertures 58 serves to direct incoming flow streams against one another thereby dissipating their energy and reducing their erosive effects. Flow body 48 has seal neck 36 attached thereto by suitable means as brazing to form a pressure tight connection. Flow body 48 has central port 60 extending axially to cross drilled port 62 within seal neck 36 to provide fluid communication with the interior of external sleeve 64 for purposes to be explained hereinafter.

External sleeve 64 is a generally cylindrical member closed on one end with stem 66 extending axially therefrom. Stem 66 has external thread 68 on the outer end thereof for connection to extension stem 70 within bonnet assembly 14. External sleeve 64 is reciprocable within flow chamber 22 and telescopes over flow cage 34 in a manner to be described hereinafter. External sleeve 64 is surrounded by retainer sleeve 72 which is closely received within bonnet passage 28 with annular metal seal ring 74 disposed in the annulus between flange 76 of retainer sleeve 72 and interior seal surface 30 of choke body 16 to provide a metal-to-metal seal therebetween Retainer sleeve 72 has bore 78 extending axially therethrough and closely fitting about stem 66 with recess 80 near its outer end. Stem packing assembly 82 is disposed in recess 80 to seal about stem 66. Retainer sleeve 72 has recess 84 formed on its interior which closely receives external sleeve 64.

External sleeve 64 is sealed within recess 84 of retainer sleeve 72 by suitable means as T seals 86a and antiextrusion rings 86b. External sleeve 64 has enlarged diameter lower portion 88 with stepped bores 90 and 92 therein. Bore 90 seals against seal assembly 42 on seal neck 38. Bore 92 has hardened seat 94 shrink fitted therein with tapered seal face 96 at its outer end which seals against tapered face 56 of flow body 48 when external sleeve 64 is in the closed position shown in FIGS. 1A and 1B. Sleeve 64 has central port 98 extending axially from bore 90 above seal assembly 42 and venting the bore 90 to the ambient pressure between choke body 16 and bonnet assembly 14 in the unlikely event of packing assembly 42 leaking. A plurality of ports 100 are disposed in the wall of external sleeve 64 to provide fluid communication between the interior of sleeve 64 and annular chamber 102 which is formed between packing assembly 82 and sealing means 86.

Bonnet assembly 14 is secured to choke body 16 by suitable means as studs 104 and nuts 106. The actuation means of bonnet assembly 14 is denoted generally by numeral 108. Actuation means 108 is a travelling nut assembly of conventional design well known by those by those skilled in the art. Extension stem 70 of actuation means 108 threadedly engages thread 68 of stem 66 of external sleeve 64 with lockwasher 110 interposed therebetween to prevent disengagement. Antirotation key 112 mounted on extension stem 70 coacts with groove 114 of bonnet assembly 14 to provide axial movement of external sleeve 64 when handwheel 116 is rotated.

Figure 2A:
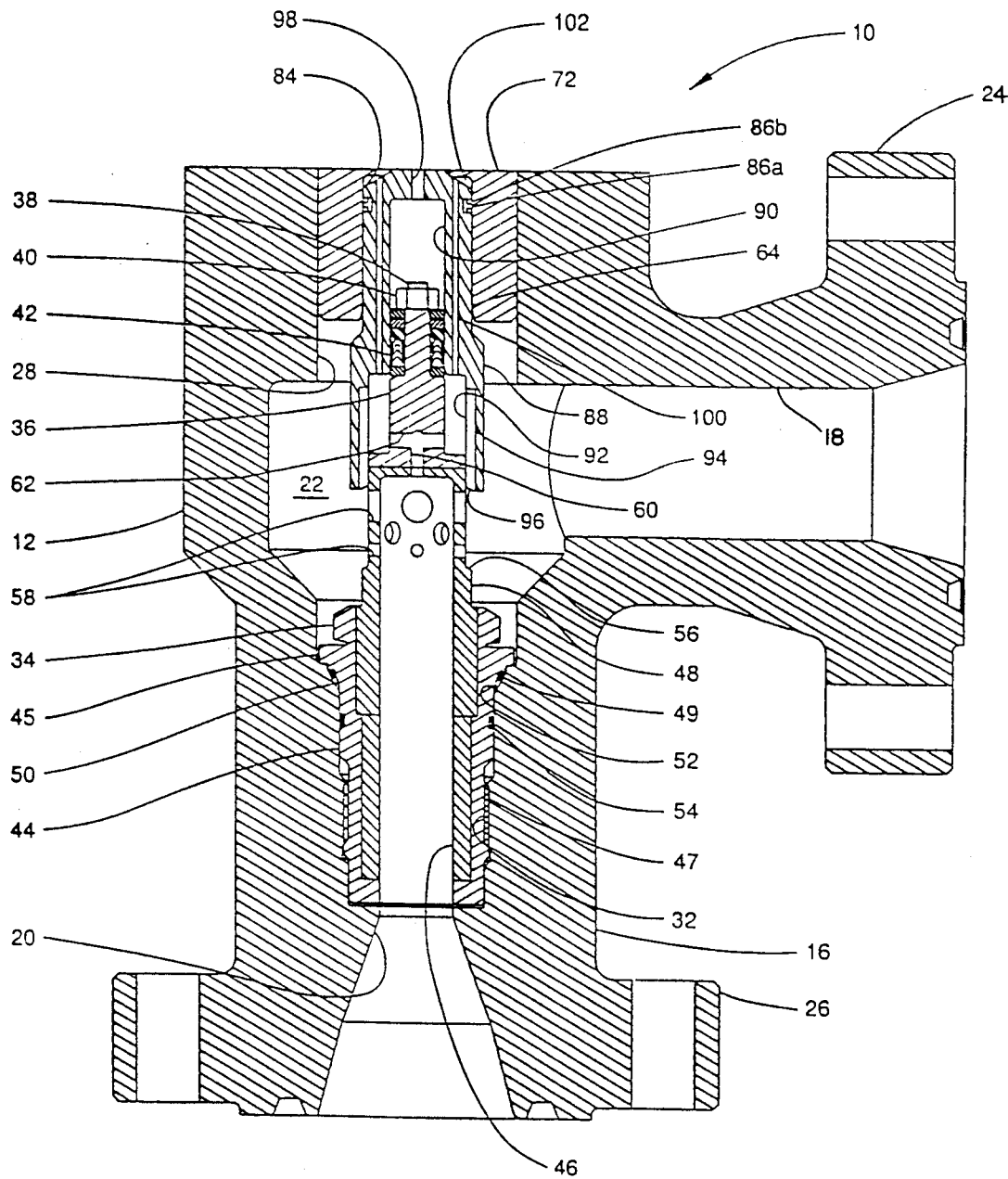
FIGS. 2A and 2B are similar views of the balanced sleeve control choke in an open, flow restricting position with FIG. 2A being the lower portion and FIG. 2B being the upper portion thereof.
Figure 2B:
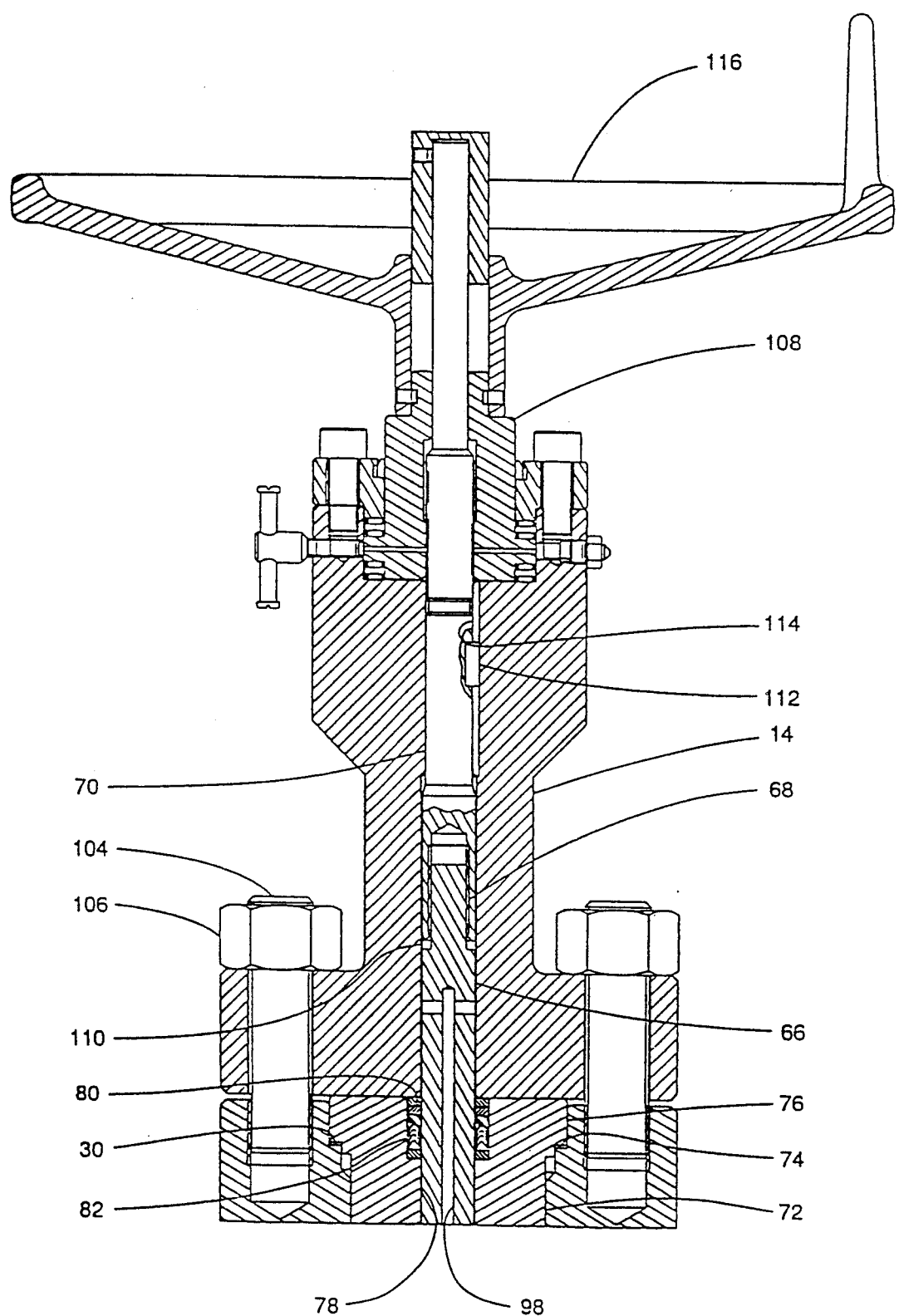

A typical sequence of operations for using the balanced sleeve control choke begins with connection of inlet and outlet flow lines (not shown) to inlet flow passage 18 and outlet flow passage 20, respectively. With the external sleeve 64 in the position shown in FIGS. 1A and 1B, tapered seal face 96 of sleeve 64 engages tapered face 56 of flow body 48 to block fluid flow through the choke assembly 10. When handwheel 116 is rotated and external sleeve 64 is moved to the position shown in FIGS. 2A and 2B, fluid flow is throttled through apertures 58 with the pressure in the downstream passage 20 less than in the upstream passage 18. As hardened seat 94 is a sliding fit on flow body 48 of flow cage 34, the pressure in the downstream passage 20 migrates past hardened seat 94 through ports 100 to annular chamber 102. Similarly, the pressure in downstream passage 20 is communicated through ports 60 and 62 to ports 100 and thence to annular chamber 102. The internal seal diameter of packing assembly 82 on stem 66 is equal to the external seal diameter of seal assembly 42 in bore 90 of external sleeve 64. The seal diameter of packing assembly 82 on stem 66 in combination with the seal diameter of T seal 86a in recess 84 of retainer sleeve 72 defines an annular area exposed to the downstream pressure which is equal to an annular area defined by the seal diameter of seal assembly 42 in bore 90 of external sleeve 64 in combination with the seal diameter of T seal 86a in recess 84 of retainer sleeve 72 which is also exposed to the downstream pressure. As these annular areas are equal, no pressure forces are imposed on stem 66 or actuation means 108. This allows the actuation means 108 to be designed to handle smaller design loads. It should also be noted that any pressure load imposed on seal assembly 42 is retained by nut 38 and external thread 40 on seal neck 36 of flow cage 34.

It will be obvious to those skilled in the art that an alternative embodiment could include other actuation means such as a hydraulic or pneumatic actuator in place of handwheel operated actuation means 108. The balancing of forces on external sleeve 64 could be applied to such an alternate embodiment without departing from the spirit or scope of the present invention. This would allow the alternate embodiment to have a smaller less expensive actuation means.

What is claimed is:

1. A pressure balanced control choke, comprising:
 a pressure containing member having an internal flow chamber with an inlet flow passage thereto and an outlet flow passage therefrom,
 a flow controlling means reciprocable to control flow between said inlet flow passage and said outlet flow passage,
 a means for positioning said flow controlling means,
 a pressure balancing means cooperating with said flow controlling means to eliminate pressure induced loading of said positioning means,
 said flow controlling means including:
  a flow cage sealingly secured within said flow chamber,
  said flow cage having a closed end with a seal neck extending therefrom and having pressure balancing ports therethrough,
  an external flow sleeve disposed about said seal neck and said flow cage, and
  said external flow sleeve reciprocable by said positioning means to thereby expose a portion of said pressure balancing ports to obtain a desired flow rate.

2. A pressure balanced control choke according to claim 1, wherein said pressure balancing means includes:
 a sealing means secured on said seal neck and sealing within said external flow sleeve,
 a retainer sleeve closely fitting about said external flow sleeve and extending through an opening in the pressure containing member,
 said retainer sleeve having an outwardly facing recess with a seal assembly disposed therein, a stem extending from said external flow sleeve and sealed thereon by said seal assembly within said recess of said retainer sleeve, a seal ring sealing the annulus between said retainer sleeve and aid pressure containing member, a sealing means on the exterior of said external flow sleeve in sealing engagement with said retainer sleeve, and said sealing means disposed on said seal neck in combination with said seal assembly in said recess of said retainer seal and said sealing means disposed on the exterior of said external flow sleeve defining a balancing chamber therebetween, a plurality of flow passages disposed within said external flow sleeve communicating fluid pressure within said outlet flow passage with said balance chamber.

3. A pressure balanced control choke according to claim 2 wherein, the seal diameter of said sealing means on said seal neck and the seal diameter of said seal assembly in said recess of said retainer sleeve are equal.

4. A pressure balanced control choke according to claim 3 wherein said positioning means includes:

a bonnet assembly sealingly secured on said pressure containing member, and a travelling nut assembly within said bonnet assembly operatively connected to said stem of said external flow sleeve by an extension stem for positioning said external flow sleeve.

5. A pressure balanced control choke according to claim 4 wherein said flow controlling means further includes:

a hardened seat of a substantially harder material positioned in the end of said external flow sleeve opposite said stem, said hardened seat closely fitting about said flow cage adjacent said pressure balancing ports, and said flow cage has a tapered seal face which prevents fluid communication between aid inlet flow passage and said outlet flow passage when said hardened seat contacts said tapered seal face, 6. A pressure balanced control choke according to claim 5 wherein:

said flow cage is of a composite construction with a flow body of a substantially harder material within said flow cage and said pressure balancing ports are disposed therein to provide fluid communication between the interior of said flow cage and the exterior of said flow cage.

7. A pressure balanced control choke according to claim 6 wherein:

said substantially harder material of said hardened seat is tungsten carbide.

8. A pressure balanced control choke according to claim 7 wherein:

said substantially harder material of said flow body is tungsten carbide.

9. A pressure balanced control choke, comprising:

a pressure containing choke body having an inlet flow passage perpendicularly intersected by an outlet flow passage to form a flow chamber therein, a passage extending outwardly from said flow chamber for mounting a bonnet assembly opposite said outlet flow passage and coaxial therewith, said bonnet assembly sealingly secured to said choke body, a flow cage sealingly secured within said flow chamber, said flow cage having a closed end with a seal neck extending therefrom and having pressure balancing ports therethrough, an external flow sleeve disposed about said seal neck and said flow cage, said external flow sleeve reciprocable by a positioning means disposed within said bonnet assembly to thereby expose a portion of said pressure balancing ports to obtain a desired flow rate, and a pressure balancing means cooperating with said flow cage and said external flow sleeve to eliminate pressure induced loading of said positioning means.

10. A pressure balanced control choke according to claim 9, wherein said pressure balancing means includes:

a sealing means secured on said seal neck and sealing within said external flow sleeve, a retainer sleeve closely fitting about said external flow sleeve and extending through said bonnet assembly mounting passage, said retainer sleeve having an outwardly facing recess with a seal assembly disposed therein, a stem extending from said external flow sleeve and sealed thereon by said seal assembly within said recess of said retainer sleeve, a seal ring sealing the annulus between said retainer sleeve and said pressure containing choke body, a sealing means on the exterior of said external flow sleeve in sealing engagement with said retainer sleeve, said sealing means disposed on said seal neck in combination with said seal assembly in said recess of said retainer seal and said sealing means disposed on the exterior of said external flow sleeve defining a balancing chamber therebetween, and a plurality of flow passages disposed within said external flow sleeve communicating fluid pressure within said outlet flow passage with said balance chamber.

11. A pressure balanced control choke according to claim 10, wherein:

the seal diameter of said sealing means on said seal neck and the seal diameter of said seal assembly in said recess of said retainer sleeve are equal.

12. A pressure balanced control choke according to claim 11 wherein said positioning means includes:

a travelling nut assembly within said bonnet assembly operatively connected to said stem of said external flow sleeve by an extension stem for positioning said external flow sleeve.

13. A pressure balanced control choke according to claim 12 wherein said flow controlling means further includes:

a hardened seat of a substantially harder material positioned in the end of said external flow sleeve opposite said stem, said hardened seat closely fitting about said flow cage adjacent said pressure balancing ports, and said flow cage has a tapered seal face which prevents fluid communication between said inlet flow passage and said outlet flow passage when said hardened seat contacts said tapered seal face.

14. A pressure balanced control choke according to claim 13 wherein:

said flow cage is of a composite construction with a flow body of a substantially harder material within said flow cage and said pressure balancing ports are disposed therein to provide fluid communication between the interior of said flow cage and the exterior of said flow cage.

15. A pressure balanced control choke according to claim 14 wherein:
said substantially harder material of said hardened seat is tungsten carbide.

16. A pressure balanced control choke according to claim 15 wherein:
said substantially harder material of said flow body is tungsten carbide.

* * * * *